(12) United States Patent
Pfeifer et al.

(10) Patent No.: US 7,611,756 B2
(45) Date of Patent: Nov. 3, 2009

(54) PROCESS FOR COATING PARTICLES FOR GENERATIVE RAPID PROTOTYPING

(75) Inventors: Rolf Pfeifer, Eislingen (DE); Jialin Shen, Bernstadt (DE)

(73) Assignee: Daimler AG, Stuttgart (DE)

( * ) Notice: Subject to any disclaimer, the term of this patent is extended or adjusted under 35 U.S.C. 154(b) by 456 days.

(21) Appl. No.: 10/545,979

(22) PCT Filed: Feb. 13, 2004

(86) PCT No.: PCT/DE2004/000258

§ 371 (c)(1),
(2), (4) Date: Jul. 17, 2006

(87) PCT Pub. No.: WO2004/073889

PCT Pub. Date: Sep. 2, 2004

(65) Prior Publication Data

US 2006/0251826 A1 Nov. 9, 2006

(30) Foreign Application Priority Data

Feb. 18, 2003 (DE) .............................. 103 06 887

(51) Int. Cl.
*H05H 1/00* (2006.01)
(52) U.S. Cl. ..................... 427/533; 427/544; 427/550; 427/554; 427/596
(58) Field of Classification Search .............. 427/533, 427/544, 550, 554, 596
See application file for complete search history.

(56) References Cited

U.S. PATENT DOCUMENTS

| | | | | |
|---|---|---|---|---|
| 5,489,449 A | * | 2/1996 | Umeya et al. | 427/450 |
| 5,585,426 A | * | 12/1996 | Williams et al. | 524/366 |
| 6,224,798 B1 | * | 5/2001 | Gay | 264/102 |
| 2001/0033899 A1 | | 10/2001 | Noguchi et al. | |
| 2004/0018109 A1 | * | 1/2004 | Blatter et al. | 419/32 |

FOREIGN PATENT DOCUMENTS

| | | |
|---|---|---|
| DE | 38 16 337 C2 | 9/1990 |
| DE | 41 09 979 A1 | 10/1991 |
| EP | 0 897 745 A1 | 2/1999 |
| EP | 1 163 999 A2 | 12/2001 |
| JP | 03267301 A | 11/1991 |
| JP | 10226801 A | 8/1998 |
| WO | WO 03/106146 A1 | 12/2003 |

* cited by examiner

*Primary Examiner*—Binh X Tran
(74) *Attorney, Agent, or Firm*—Patent Central LLC; Stephen A. Pendorf

(57) ABSTRACT

The invention relates to a method for coating particles of a plastic, metal and/or ceramic powder material for producing an adhesive-containing coating material, in particular for producing appropriate particles by compressing a 3D binder. Said coating is applied to fluidized particles in a gaseous phase by means of a coating solution, at least the particles and/or coated particles being exposed to ionized particles. A method for producing bodies or sintered bodies from organic liquid binders by compressing the 3D binder and the use thereof are also disclosed.

15 Claims, 1 Drawing Sheet

PROCESS FOR COATING PARTICLES FOR GENERATIVE RAPID PROTOTYPING

CROSS REFERENCE TO RELATED APPLICATION

This application is a national stage of PCT/DE2004/000258 filed Feb. 13, 2004 and based upon DE 103 06 887.2 filed Feb. 18, 2003 under the International Convention.

BACKGROUND OF THE INVENTION

1. Field of the Invention

The invention relates to a method for coating powder material by means of an adhesive for generative rapid prototyping processes, in particular 3D binder printing, and also the production of bodies from a coated powder material by means of generative rapid prototyping processes and its preferred use in foundry practice and precision engineering.

2. Related Art of the Invention

Among the more recent and particularly interesting powder-based generative rapid prototyping (RP) processes is the 3D binder printing process.

In a first variant of 3D binder printing, a layer of particles or granules is discharged onto an underlying surface and moistened with a binding liquid in predetermined regions, which respectively correspond to a layer of an object to be generated. The particles are wetted and adhesively bonded by the binder liquid in the moistened regions. Subsequent evaporation of the solvents in the binder liquid has the effect that the particles adhere directly to one another, fusing together at least in their edge regions. 3D binder printing processes that are related in particular to this type are known for example from European patents EP 0 644 809 B1, EP 0 686 067 B1 and European patent application EP 1 099 534 A2.

In a further variant of this method, use is made of a binder liquid containing sintering aids which, when the moistened regions are dried, leaves behind sintering aids which make it possible for the particles to be sintered as a solid mass in a subsequent sintering treatment. Hard and compact sintered bodies can be obtained in this way.

EP 0 925 169 B1 discloses a further variant of the 3D binder printing process in which mixtures of particles, fillers and adhesives are used. The binder liquid is substantially formed just by a solvent for the adhesive contained in the mixture. The adhesive may in this case also be in the form of a coating of the particles. In this respect, water-soluble polymers as powder coating and aqueous binder liquids are known. EP 1163999 A2 discloses coated particles, EP 0897745 A1 discloses coating methods.

A further process of generative rapid prototyping (RP) provides for the particles to be made to solidify in the layer by means of light, or laser-induced sintering, for example according to WO 03 106146 A1 (hereafter laser sintering). For this purpose, the layer is heated in defined regions by means of exposure to light, if appropriate also through a mask, or laser radiation to the extent that the particles can fuse together or sinter together.

The known binder printing processes have the disadvantage that the finished body exhibits a distinct shrinkage in comparison with the region originally moistened with the binder liquid. In binder printing, the particles move closer together when they are moistened, under the effect of the capillary forces and surface tension, in particular whenever adhesives that may be present are dissolved by the binder liquid, so that a distinct shrinkage has taken place already during the shaping or after the drying to form the green compact. A shrinkage in the cured regions also takes place in the case of laser-induced sintering.

The known adhesives or adhesive coatings have the disadvantage that they are hydrophilic and therefore absorb water from the surroundings, in particular from the atmospheric moisture. This generally leads to an undesired agglomeration of the particles. In the case of 3D binder printing, there is also a great absorption of binder liquid during the printing. This has a negative influence on the distinctness of image and the storage stability, and also the handling of the powder. Agglomerates lead to uneven layers of powder and defects in the bodies formed from them. For the production of homogeneous bodies of a constant quality, the pourability of the powders is also of great significance.

SUMMARY OF THE INVENTION

The object of the invention is therefore to provide a method for coating powder material which prevents an agglomeration of the primary particles and leads to improved storage stability, handling and distinctness of image, which is suitable for generative RP processes, in particular 3D binder printing, and also to present a 3D binder printing process for the production of bodies or sintered bodies with little shrinkage.

The object is achieved by a method for coating powder particles and the use of the particles coated according to the invention.

Preferred refinements of the invention are the subject of the subclaims.

BRIEF DESCRIPTION OF THE DRAWINGS

The preferred embodiments are explained in more detail on the basis of illustrations, in which.

DETAILED DESCRIPTION OF THE INVENTION

Figure 1:
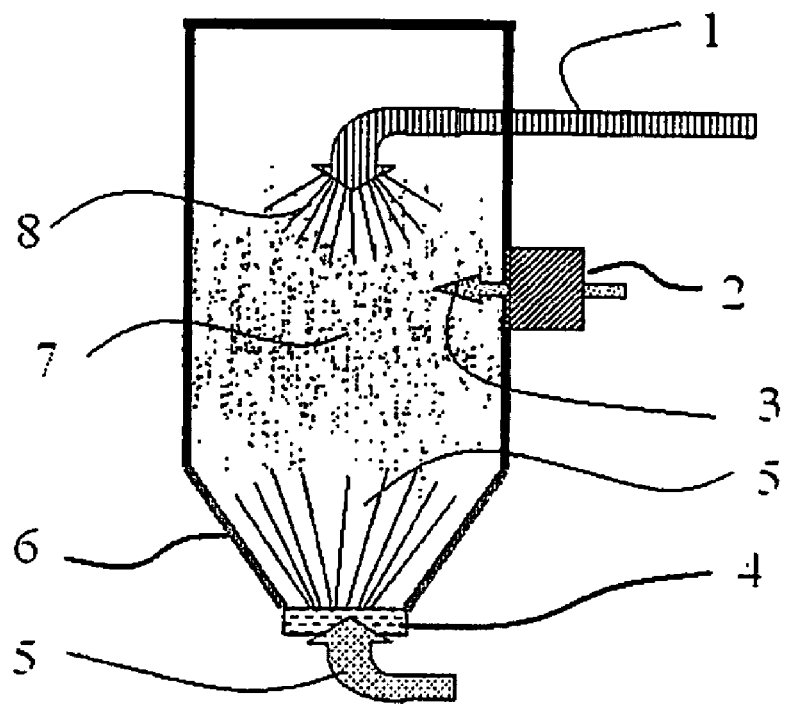
FIG. 1 shows a schematic sectional view of a fluidized bed reactor.

A first aspect of the invention concerns the method according to the invention for applying the coating of the powder material. The term powder material is to be understood as including both the individual particles or primary particles of plastic, metal or ceramic and aggregates or granules, which may in particular contain binding phases.

The coating is in this case substantially formed by an adhesive and, if appropriate, further active substances.

The adhesives that are suitable according to the invention include polymers that are soluble in organic solvents.

The polymers that are particularly suitable include poly(meth)acrylates, polyesters, polyolefins, polyvinyls, polystyrenes, polyvinyl alcohols, polyurethanes, waxes or phenolic resins. Particularly preferred adhesives are polyvinyl pyrrolidones or polyvinyl butyrals.

The metals that are suitable as powder material include in particular the metals, alloys and intermetallic phases from elements of the group Al, Ti, Nb, Cr, Fe, Co, Ni, W, Mo, Zn, Cu, Ag, Au, Sn, Pt and/or Ir.

The ceramics that are suitable as powder material include in particular the oxides, carbides and/or nitrides from at least one element of the group B, Al, Si, Al, Ti, Zr, Mg and/or Ca.

The coating of the powder material takes place according to the invention from the gas phase, in particular by application of coating material dissolved or suspended in liquid form in a solvent, from the gas phase. If the coating material is applied in liquid form to the powder material, the evaporation of the solvent preferably takes place while still in the same stage of the process. The coating material or coating solution correspondingly contains the adhesive in dissolved or colloidal form.

The methods that are suitable for applying liquid coating materials from the gas phase include in particular coating in a fluidized bed reactor or a spray dryer.

In the case of the fluidized bed reactor (FIG. 1), the powder material (7) is fed into the reactor (6) from below or from above and kept in suspension, or in the gas phase, by an air stream (5) coming from below. Escape of the particles during the coating is prevented by means of a porous membrane (4). The coating solution is introduced into the reactor by means of atomizing nozzles (1) and atomized into a mist of droplets (8). The feeding of the adhesive preferably takes place by spraying in or atomizing in solution or colloidal solution as a constituent of the coating solution. The feeding of further, in particular solid, active substances of the coating also preferably takes place by means of spraying in or atomizing of suitable suspensions or colloidal solutions. Similarly, however, solid active substances may also be added in a metered manner in the same way as the powder material.

The particles of the fluidized powder material (7), and also, if appropriate, added solid active substances, are wetted individually by the droplets. By supplying a suitable amount of heat, for example by a preheated air stream, by heating devices in the wall of the reactor (6), or by radiant heaters, the solvent of the coating solution is made to evaporate and the coating is made to set on the particles.

The separation of the coated particles takes place in a known way. This may take place continuously during the coating or else discontinuously in batch mode.

The fluidized bed process is used with preference to build up granules from primary particles.

In the case of the spray dryer (FIG. 2), the powder material is usually injected into the spray dryer as a suspension together with the dissolved adhesive, or atomized by means of an atomizing nozzle (10). The gas is fed in from above through a feed line (15) and, after drying, leaves the spray dryer through a discharge line (13). The walls of the spray dryer (11) are heated, in order to bring about the drying of the powder material (7) or the coated particles. Additional solid active substances may be fed in as a component of the coating solution or via a separate feed. The coated powder is separated in a separating device (14). This separating device is preferably formed as a cyclone separator, the gas then predominantly leaving in the separator (14) and no longer in a discharge line (13).

On account of the rubbing together of the powder particles and/or the coated particles, electrostatic charging inevitably takes place. This also applies to the metallic particles as soon as they have been coated with the non-conducting adhesive. This charging is inevitably produced by the rubbing together of the materials. This charging leads to an undesired agglomeration of the primary particles and/or of the coated particles.

It is therefore envisaged according to the invention to reduce the electrostatic charging of the powder material and/or the coated powder material (also referred to collectively hereafter as particles) by ionized particles. For this purpose, the particles, or the gas space in which the particles are present in fluidized form, are exposed to a stream of ionized particles.

This may take place for example by the metered feeding in of ionized air. Schematically represented in FIG. 1 is an ionizing device (2), which ionizes the air of an air feed (3). The ionizing nozzle at the end of the air feed (3) preferably has in this case a blowing-in cross section in the range of a few mm to a few cm. The air is blown in with slight positive pressure.

In a further refinement of the invention, a discharge electrode, which produces ions in the air surrounding it, may be provided in the coating device.

Preferred embodiments of this ionizing device are electrodes attached to two opposite walls of the dryer, or an annular electrode, whereby a large-area and uniform ionization can be produced.

Figure 2:
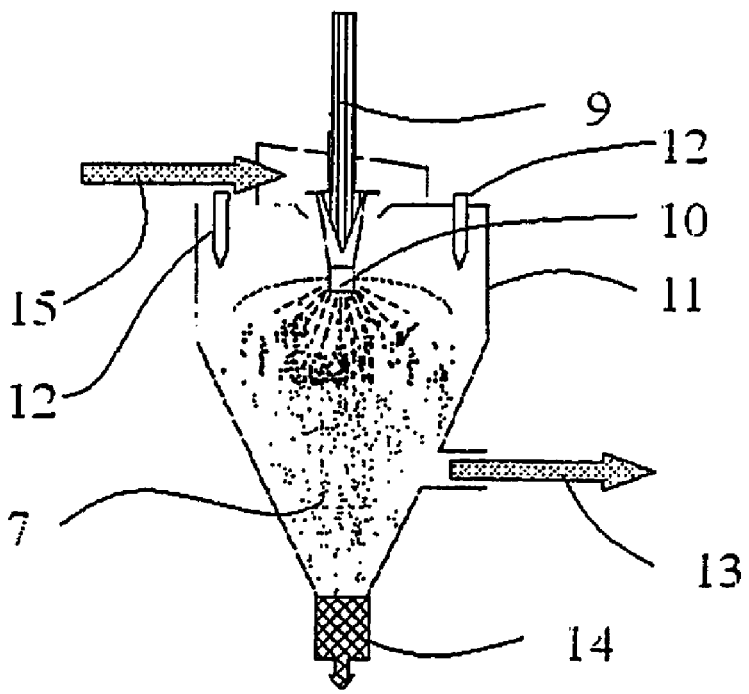
FIG. 2 shows a schematic view of a spray dryer.

A possible arrangement for a spray dryer is configured in the illustration of FIG. 2. The discharge electrodes are formed as annular electrodes (12), which protrude all round into the spray dryer (11). The electrodes are operated with AC voltage.

In a further refinement of the invention, capacitor plates which generate an electric field are formed by parts of the walls. The electric field does not have to be kept constant, but instead may also be formed as an alternating field.

The potential of the discharge electrode or the capacitor plates preferably lies in the range from 10 to −10 kV.

In a further preferred refinement of the invention, dried air is exclusively fed into the coating device. The relative humidity of the air lies below 7%, based on the process temperature of the coating device. As a result, the agglomeration of a water-induced agglutinated mass of the coated particles is reduced quite considerably. Although organic or organo-metallic polymeric compounds with low hydrophilicity are preferred as adhesives, these too generally have a residual solubility in water. Excessive humidity of the air has the effect that water absorption takes place during the coating process, in particular if the solvent of the coating is not yet completely evaporated, leading to a tacky surface.

The use of dried air additionally makes it possible to use aqueous solvents for the coating solution and/or the suspension of the solid active substances, since the humidity of the air is still lower even after the evaporation of the water from the coating.

In a further preferred embodiment, not air but an inert gas, such as for example nitrogen or argon, is used as the process gas. This has the advantage that the industrially available inert gases already have a very low water content and that no flammable or explosive gas mixtures can be produced in the coating device. This is to be seen in particular in connection with the ionizing devices.

Depending on the residence time of the powder material in the coating device, the powder particles can be coated individually, or be built up into granules by means of coating material as the binder phase. The layer thickness of the applied coating material can be set, for example, by means of the concentration in the sprayed-in solution, the residence time and the temperature in the coating device.

This method allows both coated primary particles and coated granules to be produced. In particular, it is also possible to obtain granules bonded with coating material from particles of the powder material and the solid active substances.

A further aspect of the invention concerns the coating material itself. In a first refinement of the invention, the coating material contains as adhesive an adhesive which can be solubilized, at least in part, or made to swell by suitable binding liquid, so that adjacent particles of the powder material can be adhesively bonded to one another. These particles are used with preference in 3D binder printing. The adhesives that are suitable according to the invention include in particular organic or organo-metallic polymeric compounds with low hydrophilicity. They are preferably polymers containing polar groups with low water solubility which are soluble in organic solvents, such as for example alcohols, ketones or polyethers. In particular with regard to the setting of the desired solubilities, the use of polymer blends may be of advantage. The polymers that are suitable according to the invention include, inter alia, poly(meth)acrylates, polyvinyl alcohols, polyvinyl acetates, or polyvinyl pyrrolidones. In a particularly preferred embodiment of the invention, a polyvinyl butyral or mixtures thereof is used as the adhesive.

The solvents of the adhesives that are suitable according to the invention are substantially formed by organic solvents or their mixtures. These are preferably polar solutions, their mixtures preferably having a water content below 10% by weight. Particularly preferably, the water content lies below 2% of the solvent. The chemical composition of the solvents is chosen such that the polymeric products of the coating are readily soluble in it. The preferred solvents include C2 to C7 alcohols, in particular ethyl alcohol, (iso)propanol or n-butanol, C3 to C8 ketones, such as for example acetone or ethyl-methyl ketone, cyclic ethers, such as tetrahydrofuran, or polyethers, such as methoxyethanol, dimethoxydiethylene glycol or dimethoxytriethylene glycol.

In the case of the use of wax-like adhesives, low-molecular-weight aliphatic hydrocarbons, in particular cyclic or linear C6 to C8 aliphatics are preferred.

Among the organo-metallic polymers, polycarbosilanes or polysilazanes are of significance in particular.

In a further embodiment, the adhesive is formed by meltable or sinterable polymers, the melting and/or sintering temperature preferably lying in the temperature interval from 50 to 180° C. If plastics are used as the powder material, it must be ensured that the melting or sintering temperature of the adhesives lies below the corresponding temperatures of the powder material. The difference in temperature should be at least 20° C. Used with particular preference here as adhesives are thermoplastics, such as PMMA or PE.

The thickness of the coating containing the adhesive in this case preferably lies in the range from 0.1 to 10% of the average diameter of the powder material. Typically, the thickness of the adhesive layer is 50 nm to 5 µm. The preferred amount of adhesive lies in the range from 0.3 to 8% by weight of the respectively coated powder material.

In a preferred refinement of the invention, the powder material is formed by granules of which the binding phase predominantly comprises the adhesive.

In a further refinement of the invention, the adhesives are built up from substantially non-polar polymers, for example waxes. These adhesives are suitable in particular for metallic powder material. These adhesives can be activated both by binder liquid and by laser sintering.

The adhesives preferred according to the invention have the effect that on the surface of the powder material there is formed a water-insoluble to hydrophobic layer which no longer tends to absorb water from the surroundings, in particular the atmospheric moisture. This has the advantage that the coated particles are highly stable in storage and excellent in terms of handling. A further advantage lies in the improvement of the distinctness of image of the binder print. Since the individual coated particles no longer tend to agglutinate under the influence of atmospheric moisture, no secondary agglomerates form.

The minimum thickness of a material layer which can be discharged in the 3D binder printing process is therefore that of the diameter of the particles of the powder material and not that of the diameter of secondary agglomerates that may be formed from them.

In a further advantageous refinement of the invention, solid active substances are contained in the coating. The solid active substances are preferably formed by fine-grained material of sinterable and/or glass-forming microparticles. A distinction is to be drawn here between the powder material comprising individual particles of a powder or else aggregates formed by agglomeration, in particular granules, which may be interspersed with non-powder binding phases, and the fine-grained material. The fine-grained material comprises individual particles of dimensions which lie distinctly below the dimensions of the powder material. The average particle sizes of the fine-grained material typically lie below 30% of the particle size of the powder material and preferably in the range from 0.3 to 5%. Particularly preferably, the fine-grained material comprises submicron particles or nanoparticles. The fine-grained material in this case lies partly within the coating formed by the adhesive. Particles protruding from the coating are also preferably covered by adhesive.

In a further refinement of the invention, the coating of a powder material of metal or ceramic contains a sinterable and/or glass-forming fine-grained material which is suitable for forming a solid sintering or glass phase in later thermal treatment of the body (or green compact) formed by the 3D binder printing process. The arrangement according to the invention of the fine-grained particles on the surface of the individual powder particles leads to sintered or glass bridges being formed between adjacent powder particles in the thermal treatment of the green compact. As a result, a solidification of the green compact takes place, or the formation of a solid sintered body. The shrinkage hereby taking place is minimal, since it is restricted to the small fine-grained particles. If this thermal treatment is performed below the glass-forming or sintering temperature of the powder material, virtually no sintering shrinkage of the complete body or green compact occurs.

Therefore, powder material and fine-grained material are preferably selected such that the fine-grained particles have a lower sintering or glass-forming temperature than the powder material. This temperature difference preferably lies above 30° C. and particularly preferably above 100° C.

In principle, it is the case with material of the same type that, on account of their greater surface energy, the smaller particles have a lower sintering temperature or glass-forming temperature than the larger ones. This effect becomes very clear in particular in the case of the preferred fine-grained particles in the submicrometer or nano range. Therefore, the material combinations preferred according to the invention comprise both different and identical chemical compounds.

In the same way as in the case of the powder material, the fine-grained material may be ceramic, metals or ceramic, with materials that are chemically compatible (in particular chemically closely related) being preferred. Typically, the material of the fine-grained particles comprises the sintering aids that are customary for the respective powder material. Particularly preferred are $SiO_2$, silicates, borosilicates or alumosilicates, in particular in combination with powder material of oxide ceramic.

In a particularly preferred refinement of the invention, the powder material is substantially formed by $ZrSiO_4$, $ZrO_2$ and/or $Al_2O_3$ and the fine-grained material is substantially formed by $SiO_2$, in particular $SiO_2$ nanopowder.

In a further preferred refinement, powder material and fine-grained material are substantially formed by SiC. In this case, adhesives based on organo-silicon polymers are preferred.

In the case of metallic powder material, the fine-grained material is preferably formed from metals or alloys of the elements Cu, Sn, Zn, Al, Bi, Fe and/or Pb. For metallic powder material, metal salts, which can be thermally decomposed to form the corresponding metals, are similarly also suitable as fine-grained material.

A further aspect of the invention concerns a method for producing a body from the powder material coated according to the invention. Here, the powder material is initially discharged as a thin layer of powder. The methods customary in binder printing technology can be used here. The low water absorption of the powders coated according to the invention has the effect that distinct advantages occur in this method step with regard to uniformity of the layer of powder and in handling the powder.

The coating according to the invention also allows layers of powder with few layers of particles, depending on the starting powder even just comprising a single particle monolayer. Therefore, with the powder materials coated according to the invention, minimum layer thicknesses of below 40 μm are possible, depending on the starting particles even below 15 μm.

In the method step which then follows, the layer of powder is cured in defined regions by activation of the adhesive.

In the case of the 3D binder printing process, the binder liquid is substantially formed by organic solvents or their mixtures. In this case, the substances that are suitable as solvents for the coating material are preferably used. According to the invention, the water content lies below 45% by weight and particularly preferably below 5% by weight. The chemical composition of the binder liquid is chosen such that the polymeric products of the coating are soluble, or at least swellable, in it. Particularly preferred are low alcohols, such as ehtyl alcohol, (iso)propanol or n-butanol, acetone or ethyl-methyl ketone or tetrahydrofuran. If appropriate, additives which influence volatility and wetting may be added. These include, inter alia, surfactants, multivalent alcohols, such as ethylene glycol, glycerine or low-molecular-weight carbonic acids. In the case of use of wax-based adhesives, cyclic or linear C6 to C8 aliphatics are preferred in particular.

The binder liquid is preferably virtually free from solid or insoluble constituents. Its content is typically not above 5% by weight. The low content or the complete absence of solid substances in the binder liquid provides distinct advantages for the reliability and durability of the binder nozzles. Abrasion and clogging of the print heads no longer occur in principle with the binder liquids according to the invention.

According to the invention, the amount of binder liquid is chosen such that it is not sufficient to dissolve all the adhesive that is bonded in the coating. In particular, the binding phases of granules that may be used are also not dissolved. Rather, the amount of binder liquid is metered such that it is only sufficient to dissolve or solubilize at the points of contact, or areas of contact, of adjacent particles. The enrichment of the binder liquids in these contact zones is assisted by the effects of capillary action.

The amount of binder liquid used for moistening the powder preferably lies in the range from 5 to 70% by volume of the volume of powder to be coated. Particularly preferably, the amount of binder liquid is 5 to 25 times the volume of the adhesive that is present in the coating.

Vaporization which then follows allows the adhesive to take effect. In this case, the use of organic solvents proves to be a further advantage over the known aqueous binder liquids. On account of the higher vapor pressure of the organic solvents, the moistened locations dry much more quickly than is the case with conventional systems. This has positive effects on the distinctness of image and the speed of the process.

The process steps of applying the powder material and moistening are repeated in the known way to build up a 3D body. On account of the minimal swelling and shrinking processes, even comparatively large bodies can be produced virtually free from stress. The powder material coated according to the invention and the process according to the invention allow the linear material shrinkage to fall below 2% of the correspondingly sprayed surface area.

A further aspect of the invention concerns the production of sintered bodies from ceramic-containing or metal-containing powder mixtures. In this case, green compacts that can be obtained by means of the 3D binder printing process described and by using the powder particles coated according to the invention are taken as a basis. The green compacts may be sintered in a known way to form porous or dense ceramic or metals. One or more redensifications of the initially porous green compacts or sintered bodies may be of advantage here.

If the coating contains fine-grained material, the green compacts are preferably fired at a temperature below the sintering temperature or glass transition temperature of the powder material and above that of the fine-grained material contained in the coating. Below the sintering temperature is understood here as meaning the temperature of the middle sintering stage, in which the formation of a contiguous pore space takes place, the individual particles are no longer identifiable and the sintering shrinkage begins. The firing temperature of the green compacts preferably lies at least 30° C. below the sintering or glass-forming temperature of the powder material. As a result, the shrinkage caused by sintering and/or glass formation is restricted substantially to the fine-grained material. The volume effects caused as a result are minimal, in comparison with the overall volume of the green compact or sintered body. It is therefore possible to produce solid sintered bodies which have a linear shrinkage of at most 2% in comparison with the dimensions predetermined in the 3D binder printing process.

An application preferred according to the invention for the green compacts or sintered bodies obtained by means of ceramic powder material is in foundry practice and mold making. For example, $Al_2O_3$ or $ZrSiO_4$ ceramic bonded by $SiO_2$ fine-grained material is suitable as molds or inserts in the precision casting of metals.

A preferred application for the bodies obtained by means of plastics powder material is in the production of mold cores for the construction of casting molds. By applying sand or coating with slip, the bodies of plastic can for example be made into casting molds for metal casting.

The porous metallic bodies are suitable for example for applications in heat exchangers or catalytic converters. By resintering or suitable redensification, subminiature components and microcomponents can be produced for a wide variety of precision engineering applications.

The invention claimed is:

1. A method for coating a plastic, metal and/or ceramic powder material with a coating containing a binder liquid activatable or laser light activatable organic or organo-meteallic adhesive, the method comprising:
   providing particles of the powder material to be coated in a fluidized form in a gas phase; and
   depositing the organic or organo-meteallic adhesive from a solution onto the particles of the powder material to form coated particles
   wherein the particles, the coated particles or the gas space in which the particles are present in fluidized form are exposed to sufficient ionized particles to reduce the electrostatic charging of the powder material and/or the coated powder material.

2. The method as claimed in claim 1, wherein at least the gas phase coming into contact with the coated particles is substantially water-free.

3. The method as claimed in claim 1, wherein granules which comprise the adhesive as a binding phase are formed during the coating.

4. The method as claimed in claim 1, wherein the layer thickness of the coating containing the adhesive lies in the range from 40 nm to 5 μm.

5. The method as claimed in claim 1, wherein the amount of the coating lies at 0.3 to 8% by weight of the powder material.

6. The method as claimed in claim 1, the coated particles being used for producing a body, comprising the repeated sequence of the steps of:
   discharging a layer of powder of coated particles on an underlying surface,
   melting or sintering the adhesive, at least of the discharged layer of powder, by laser irradiation,
   wherein the energy of the laser light is substantially insufficient to melt or sinter the powder particles of the layer of powder.

7. The method as claimed in claim 1, wherein, in addition to the adhesive, further active substances are deposited onto the surface of the powder material.

8. The method as claimed in claim 7, wherein the active substances comprise polymeric, metallic or ceramic nanoparticles and/or microparticles with an average grain size below 5 μm.

9. The method as claimed in claim 1, wherein the adhesive is composed of an adhesive of organic and/or organo-metallic polymers.

10. The method as claimed in claim 9, wherein the water content of the solution of the adhesive lies below 5% by weight.

11. The method as claimed in claim 1, the coated particles being used for producing a body, comprising the repeated sequence of the steps of:
   discharging a layer of powder of coated particles on an underlying surface,
   moistening defined regions of the layer of powder with a binder liquid, wherein
   one of the layers of powder has a thickness below 250 μm, and
   the binder liquid is substantially formed by organic solvents and has a water content below 45% by weight.

12. The method as claimed in claim 11, wherein the proportion of insoluble constituents in the binder liquid lies below 5% by weight.

13. The method as claimed in claim 11, wherein the amount of binder liquid used for moistening the powder lies in the range from 5 to 70% by volume of the powder volume to be coated.

14. The method as claimed in claim 11, further comprising sintering the produced body.

15. The method as claimed in claim 14, further comprising using the sintered body in foundry practice, in mold making or in tool making.

\* \* \* \* \*